(12) United States Patent
Hillyer

(10) Patent No.: US 9,078,487 B2
(45) Date of Patent: Jul. 14, 2015

(54) FOOTWEAR INCLUDING A REMOVABLE AND REPLACEABLE UPPER

(71) Applicant: Deckers Outdoor Corporation, Goleta, CA (US)

(72) Inventor: Chris Hillyer, Goleta, CA (US)

(73) Assignee: DECKERS OUTDOOR CORPORATION, Goleta, CA (US)

( * ) Notice: Subject to any disclaimer, the term of this patent is extended or adjusted under 35 U.S.C. 154(b) by 155 days.

(21) Appl. No.: 13/755,551

(22) Filed: Jan. 31, 2013

(65) Prior Publication Data

US 2014/0208616 A1   Jul. 31, 2014

(51) Int. Cl.
*A43B 3/12* (2006.01)
*A43B 3/00* (2006.01)
*B29D 35/10* (2010.01)
*A43B 3/10* (2006.01)
*B29D 35/12* (2010.01)

(52) U.S. Cl.
CPC .............. *A43B 3/0078* (2013.01); *A43B 3/103* (2013.01); *A43B 3/105* (2013.01); *B29D 35/10* (2013.01); *B29D 35/126* (2013.01); *B29D 35/128* (2013.01)

(58) Field of Classification Search
CPC .......... A43B 3/244; A43B 3/103; A43B 3/12; A43B 3/122; A43B 3/102; B29D 35/10
USPC .................................. 36/11.5, 101, 50.1, 50.5
See application file for complete search history.

(56) References Cited

U.S. PATENT DOCUMENTS

| 3,553,754 | A | | 1/1971 | Mendelsohn |
| 4,034,431 | A | * | 7/1977 | Fukuoka ................. 12/142 MC |
| 4,150,455 | A | * | 4/1979 | Fukuoka ................. 12/142 RS |
| 4,172,330 | A | | 10/1979 | Kao |
| 4,535,554 | A | | 8/1985 | De Obaldia B. |
| 4,578,843 | A | | 4/1986 | Lewis |
| 4,839,948 | A | | 6/1989 | Boros |
| 5,467,507 | A | | 11/1995 | Marsh et al. |
| 5,670,274 | A | | 9/1997 | Forrer |
| 5,802,738 | A | * | 9/1998 | Ferniani ....................... 36/11.5 |
| 5,896,684 | A | | 4/1999 | Lin |
| 6,883,252 | B2 | | 4/2005 | Cagner |
| 7,540,098 | B2 | | 6/2009 | Bast et al. |
| 7,650,704 | B2 | | 1/2010 | Richardson |
| 7,694,436 | B2 | | 4/2010 | Mullen |
| 8,171,654 | B2 | | 5/2012 | Rudd, Jr. et al. |
| 2009/0044423 | A1 | | 2/2009 | Amsterdam |
| 2009/0260260 | A1 | | 10/2009 | Whitaker et al. |
| 2009/0320325 | A1 | | 12/2009 | Escario |
| 2010/0095493 | A1 | | 4/2010 | Chawla et al. |
| 2010/0132223 | A1 | | 6/2010 | Lewis |
| 2011/0314694 | A1 | | 12/2011 | Marmar et al. |

* cited by examiner

*Primary Examiner* — Ted Kavanaugh
(74) *Attorney, Agent, or Firm* — Greer, Burns & Crain, Ltd.

(57) ABSTRACT

An article of footwear including a fabric upper and at least one connector having an upper member with two spaced sidewalls. At least a portion of the upper being inserted between and co-molded with the sidewalls of the connector.

18 Claims, 4 Drawing Sheets

FOOTWEAR INCLUDING A REMOVABLE AND REPLACEABLE UPPER

BACKGROUND

Sandals, flip flops and similar open-toe shoes typically include an upper attached to an outsole. For example, conventional flip flops include an upper having a toe post and side supports extending from the toe post. The upper may be made out of rubber, ethylene vinyl acetate (EVA) or fabric. Fabric uppers are usually made using one or two lengths of fabric stitched at one end to form the toe post and the free ends extending from the toe post form the side supports on opposing sides of the upper.

To secure the upper to the outsole, the outsole includes an upper part and a lower part such that a portion of the toe post is inserted through an opening in the upper part of the outsole and extends underneath the upper part such that when the lower part is attached to the upper part, the portion of the toe post is secured between the upper and lower parts. Similarly, the ends of the side supports extend around the sides of the upper and underneath the upper part of the outsole such that the side support ends are also secured between the upper and lower parts of the outsole when the parts are attached together. Manufacturing sandals and flip flops in this manner requires extra material for securing the toe post and side supports between the upper and lower parts of the outsole, which increases manufacturing and material costs.

Accordingly, there is a need for a fabric upper that is easily attached to and removable from an outsole while reducing the manufacturing and material costs associated with making these shoes.

BRIEF SUMMARY

The present article of footwear includes a fabric upper removably connected to an outsole by inserting connectors co-molded to the upper through through-holes defined by the outsole thereby reducing manufacturing time and material costs.

An embodiment of the present article of footwear includes a fabric upper and at least one connector having an upper member with two spaced sidewalls. At least a portion of the upper being inserted between and co-molded with the sidewalls of the connector.

Another embodiment of the present article of footwear includes an outsole having a through-hole and a fabric upper including at least one connector. The connector includes an upper member having two spaced sidewalls, where at least a portion of the upper is inserted between and co-molded with the sidewalls. The upper is connected to the outsole by inserting the at least one connector through the through-hole of the outsole.

Another embodiment of the present article of footwear includes an outsole including a plurality of through-holes and a fabric upper including a toe post, two lateral supports extending from the toe post and a plurality of connectors. Each of the connectors includes an upper member having two spaced sidewalls where the toe post and at least a portion of each of the lateral supports is inserted between and co-molded with the sidewalls of one of the connectors. The upper is connected to the outsole by inserting each of the connectors through a corresponding one of the plurality of through-holes of the outsole.

DETAILED DESCRIPTION

Figure 1:
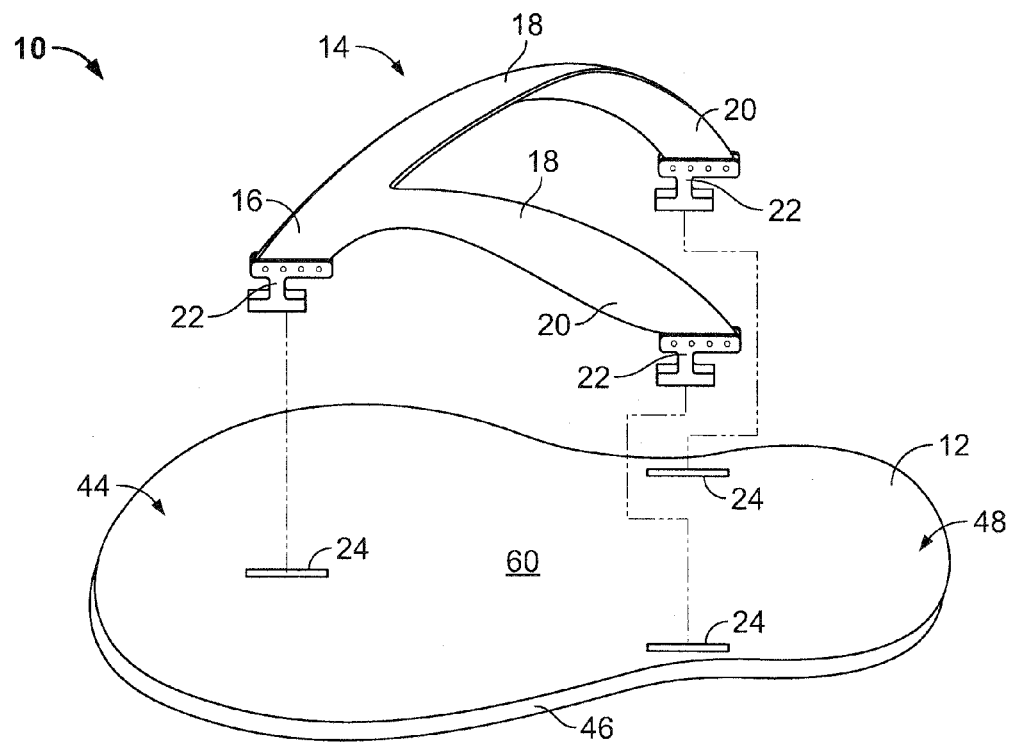
FIG. 1 is an exploded perspective view of the article of footwear of the present invention.
Figure 2:
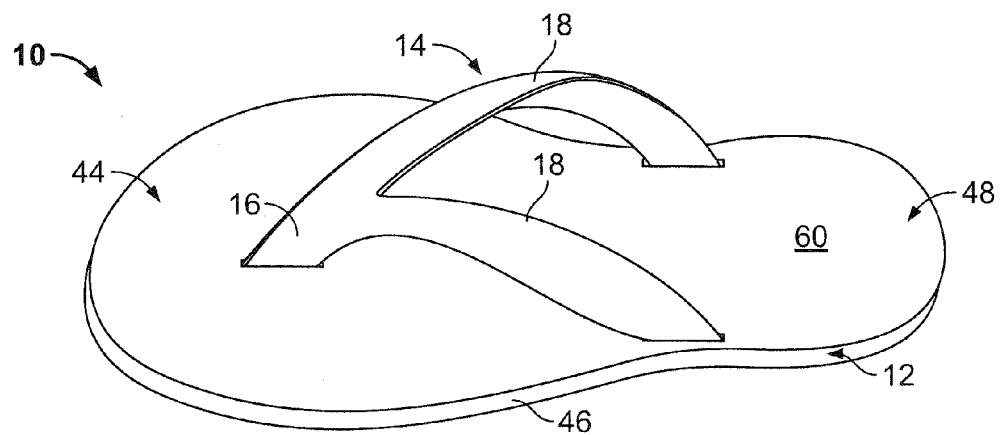
FIG. 2 is a perspective view of the article of footwear of FIG. 1 showing the upper connected to the outsole.

Referring now to FIGS. 1-7, a present article of footwear is illustrated that includes an upper having connectors that enable the upper to be removably attached to an outsole for easy assembly and reduction of cost and materials associated with making the article of footwear.

The present article of footwear 10 includes an outsole 12 and a fabric upper 14 attached to the outsole where the upper has a toe post 16 and two lateral supports 18 extending from the toe post. The toe post 16 and each end 20 of the lateral supports 18 includes a plug-type connector 22 that are each inserted through openings or through-holes 24 formed in the outsole 12 to secure each 20 end of the lateral supports 18 and the toe post 16 to the outsole.

Figure 4:
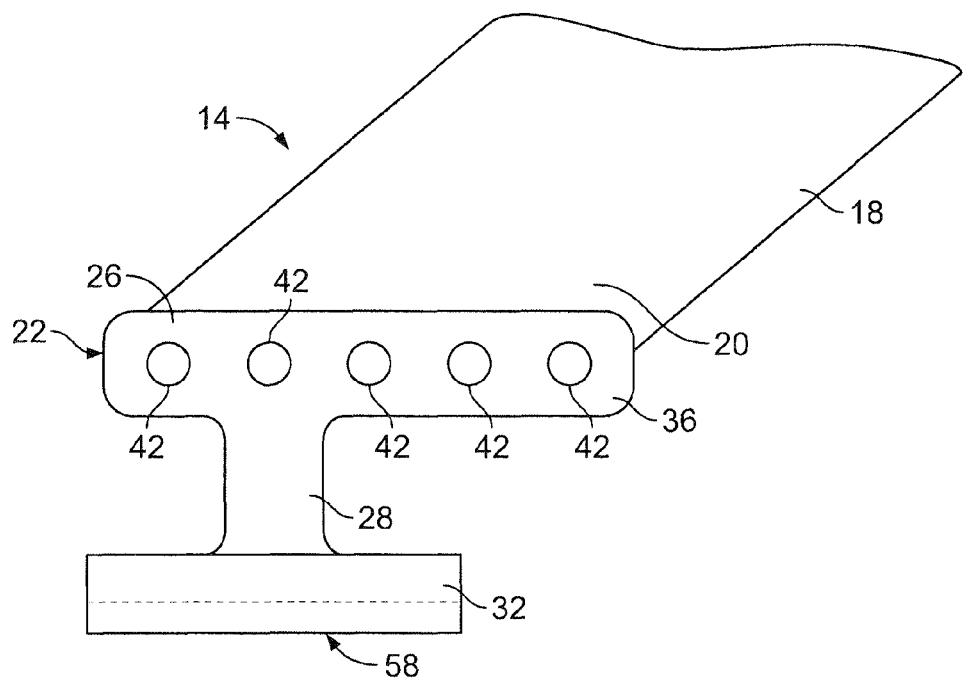
FIG. 4 is an enlarged side view of a connector attached to a portion of the upper.
Figure 5:
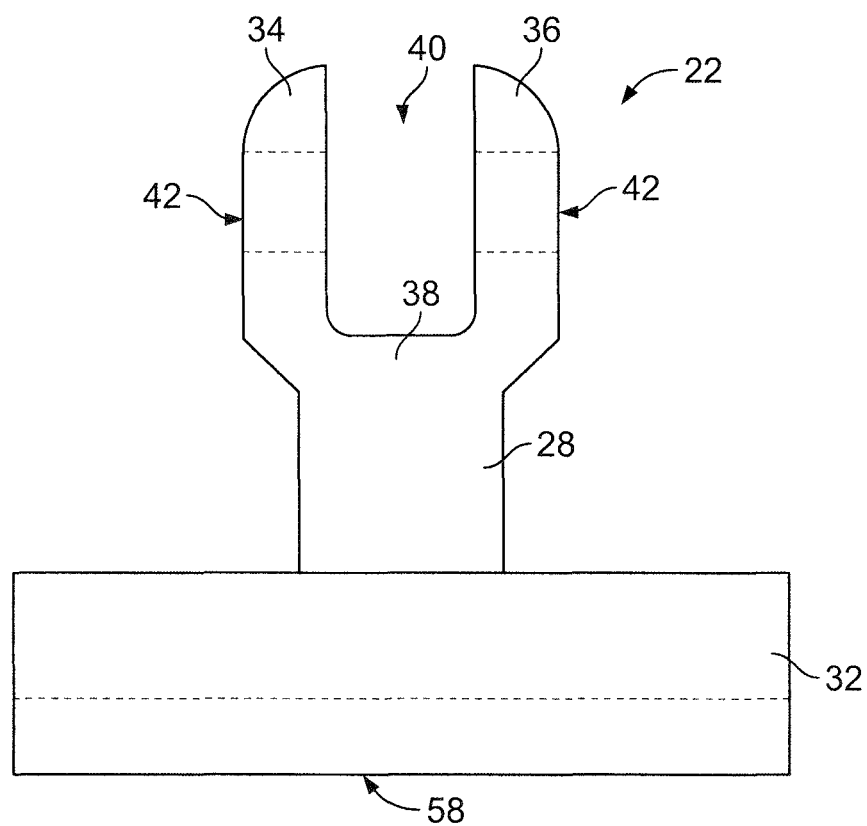
FIG. 5 is an enlarged front view of the connector of FIG. 4 with the portion of the upper removed from the connector.
Figure 6:
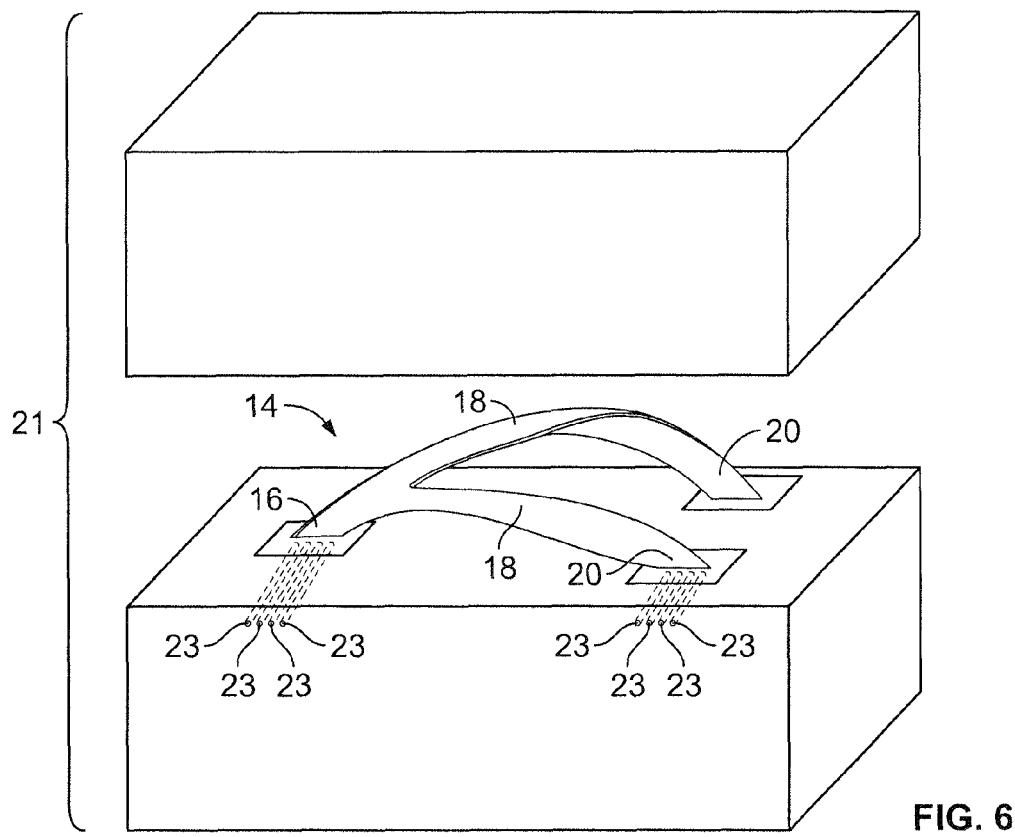
FIG. 6 is perspective view of a mold used to form the upper of the article of footwear of FIG. 1.

Referring now to FIGS. 4 and 5, each of the connectors 22 includes a U-shaped upper member 26, a support post 28 connected to the U-shaped upper member at one end 30a and to a lower securing member 32 at an opposing end 30b. The upper member 26 includes a first sidewall 34 and a second sidewall 36 that are spaced from each other and joined together by a bottom wall 38 where the first sidewall, the second sidewall and the bottom wall define an open channel 40 as shown in FIG. 5. The support post 28 is preferably integrally formed with and extends from the bottom wall 38 and is also integrally formed with the lower member 32 which has a cylindrical shape. It should be appreciated that the lower member 32 may have a square shape or any suitable shape.

Referring now to FIGS. 1, 2, 4 and 6, the toe post 16 and each end 20 of the lateral supports 18 are co-molded with one or more of the connectors 22. Specifically, the toe post 16 and/or the free ends 20 of the lateral supports 18, which are fabric ends, are inserted into a mold 21. A plurality of pins 23 movably connected to the mold and are used to hold the free material ends 20 and the material end forming the toe post 16 in position in the mold 21 during the molding process. Once the material or fabric ends are secured in the mold 21, a separate material, such as Ethylene Vinyl Acetate (EVA) or rubber, which forms the connector, is injected into the mold via a suitable inlet. The injected material forms the first and second sidewalls 34, 36 of the upper member 26 and surrounds the opposing sides of the fabric end or ends, and at least partially seeps into the fabric such that when the injected material cures it is securely intertwined with and connected to the fabric ends. The support post 28 and the lower member 32 are also formed during the injection molding process such that when the molding operation is complete, one of the integrally formed connectors is securely co-molded with at least one of the toe post 16 and each end 20 of the lateral supports 18 of the upper 14. After the material is injected into the mold 21, the pins 23 are removed from the fabric thereby forming a series of openings 42 in the first and second sidewalls 34, 36 of each connector 22. It should be appreciated that any suitable number of pins 23 may be used to hold the fabric ends of the upper 14 in position in the mold 21 during the molding process.

Figure 3:
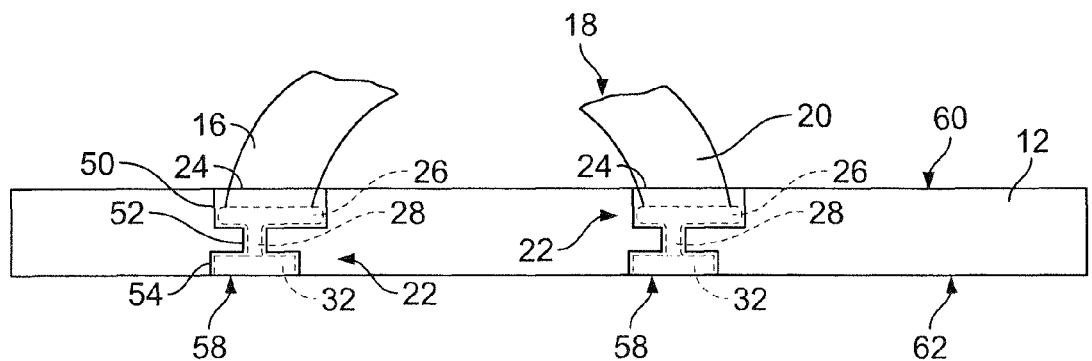
FIG. 3 is a fragmentary side view of the article of footwear of FIG. 2.

After the ends of the toe post 16 and ends 20 are co-molded with one or more of the connectors 22, the connectors 22 are attached to the outsole 12. Specifically, the outsole 12 defines one or more openings or through-holes 24 where one of the through-holes 24 is located at a forefront portion 44 of the outsole and two additional through-holes 24 are located on each side 46 of the outsole near the heel portion 48 of the outsole. As shown in FIG. 3, each of the through-holes 24 includes an upper portion 50, a central portion 52 and a bottom portion 54 that correspond to the size and shape of the connectors 22. Specifically, the upper portion 50 has a size and shape that corresponds to the size and shape of the upper member 26, the central portion 52 has a size and shape that corresponds to the size and shape of the support post 28 and the lower portion 54 has a size and shape that corresponds to the size and shape of the lower member 32. To facilitate insertion of the connectors 22 through the through-holes 24, the outsole 12 is made of a foam material or other suitable material that is flexible such that when each connector 22 is inserted into each through-hole 24, the material flexes or expands to allow the lower member 32 of each connector 22 to be pushed through the through-holes 24 and then seated in the bottom recessed portion 54 of the through-holes.

In the illustrated embodiment, the upper and lower portions 50, 54 of the through-holes 24 are recessed such that after the connectors 22 are inserted into and through each of the through-holes, a top surface 56 of the upper member 26 and a bottom surface 58 of the lower member 32 are respectively flush with upper and lower surfaces 60 and 62 of the outsole 12. The lower member 32 of each of the connectors 22 is configured to have a width or diameter that is greater than a width or diameter of the support post 28 such that when the connectors are inserted and connected to the outsole 12, the lower member cannot be readily moved through or removed from the through-holes 24 during use.

Figure 7:
FIG. 7 is a bottom view of the connector of FIG. 4.

Referring now to FIG. 7, in an embodiment, the bottom surface 58 of the lower member 32 of each connector 22 includes a symbol, logo, insignia or other suitable symbol or logo 64 molded onto the connector. The symbol 64 on the bottom surface 58 of the connector 22 can be used to identify the style, brand or other information about the connector or the article of footwear. It should be appreciated that any suitable symbol, insignia, logo or identifier may be molded or attached to the bottom surface 58 of the connectors 22.

While a particular embodiment of the present article of footwear 10 has been described herein, it will be appreciated by those skilled in the art that changes and modifications may be made thereto without departing from the invention in its broader aspects.

What is claimed is:

1. An article of footwear comprising:
a fabric upper;
at least one connector including an upper member connected to a planar lower member, said upper member having two spaced sidewalls that are each perpendicular to said lower member, at least a portion of said upper being inserted between and co-molded with said sidewalls.

2. The article of footwear of claim 1, further comprising a plurality of connectors, wherein said fabric upper includes a toe post and two lateral supports, one of said plurality of connectors being connected to said toe post and each of said lateral supports.

3. The article of footwear of claim 1, wherein said sidewalls define a channel therebetween and said upper is inserted in said channel.

4. The article of footwear of claim 1, wherein said at least connector includes a support post, said support post having a first end connected to said upper member and an opposing, second end connected to said lower member.

5. The article of footwear of claim 4, wherein said support post and said lower member each have widths, said width of said lower member being greater than said width of said support post.

6. The article of footwear of claim 4, wherein said support post and said lower member each have diameters, said diameter of said lower member being greater than said diameter of said support post.

7. The article of footwear of claim 4, wherein said upper member, said support post and said lower member each have widths, said widths of said upper member and said lower member each being greater than said width of said support post.

8. An article of footwear comprising:
an outsole including a through-hole; and
an upper including at least one connector including an upper member connected to a planar lower member, said upper member having two vertically oriented, spaced sidewalls extending perpendicular to said lower member, at least a portion of said upper being inserted between and co-molded with said sidewalls, said upper being connected to said outsole by inserting said lower member of said at least one connector through said through-hole.

9. The article of footwear of claim 8, wherein said at least connector includes a support post, said support post having a first end connected to said upper member and an opposing, second end connected to said lower member.

10. The article of footwear of claim 9, wherein said through-hole includes an upper portion, a central portion and a lower portion corresponding to said upper member, said support post and said lower member of said at least one connector.

11. The article of footwear of claim 9, wherein said through-hole includes a recessed lower portion, said lower member of said at least one connector being seated in said lower portion after said at least one connector is inserted through said through-hole such that a bottom surface of said lower member is flush with a bottom surface of said outsole.

12. The article of footwear of claim 9 wherein said lower member includes at least one of a symbol, a logo and an insignia.

13. The article of footwear of claim 9, wherein at least one of said support post and said lower member have a cylindrical shape.

14. The article of footwear of claim 13, wherein said support post and said lower member each have diameters, said diameter of said lower member being greater than said diameter of said support post.

15. The article of footwear of claim 9, wherein said support post and said lower member each have widths, said width of said lower member being greater than said width of said support post.

16. The article of footwear of claim 9, wherein said upper member, said support post and said lower member each have widths, said widths of said upper member and said lower member each being greater than said width of said support post.

17. An article of footwear comprising:
an outsole including a plurality of through-holes;

an upper including a toe post and two lateral supports extending from said toe post; and a plurality of connectors, each of said connectors including an upper member connected to a lower member, said upper member having a bottom wall and two vertically oriented, spaced sidewalls extending upwardly from and being perpendicular to said bottom wall, said bottom wall and said lower member being parallel to each other, said toe post and at least a portion of each of said lateral supports being inserted between and co-molded with said sidewalls of one of said connectors, wherein said upper is connected to said outsole by inserting at least said lower member of each of said connectors through a corresponding one of said plurality of through-holes.

18. The article of footwear of claim 17, wherein said upper is made of fabric.

* * * * *

UNITED STATES PATENT AND TRADEMARK OFFICE
CERTIFICATE OF CORRECTION

PATENT NO. : 9,078,487 B2
APPLICATION NO. : 13/755551
DATED : July 14, 2015
INVENTOR(S) : Chris Hillyer Page 1 of 1

It is certified that error appears in the above-identified patent and that said Letters Patent is hereby corrected as shown below:

In the Claims:

Col. 4, lines 4-5, Claim 4    Please delete "at least connector" and insert --at least one connector-- therefor.

Col. 4, lines 32-33, Claim 9    Please delete "at least connector" and insert --at least one connector-- therefor.

Signed and Sealed this
Fifteenth Day of March, 2016

Michelle K. Lee
*Director of the United States Patent and Trademark Office*